N. A. CHRISTENSEN.
PROPELLER.
APPLICATION FILED OCT. 6, 1916.
1,369,399.
Patented Feb. 22, 1921.
2 SHEETS—SHEET 1.
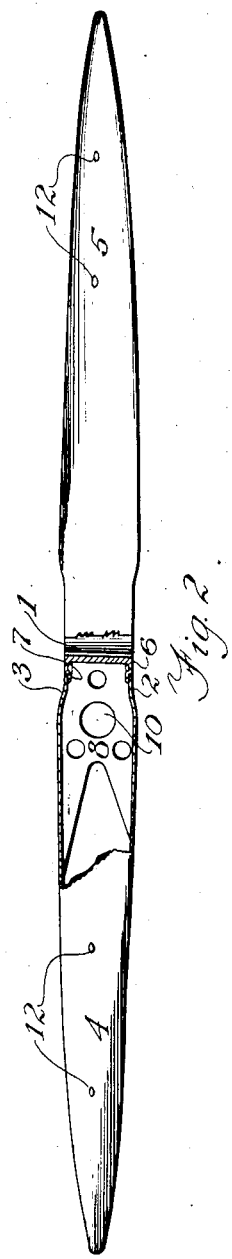
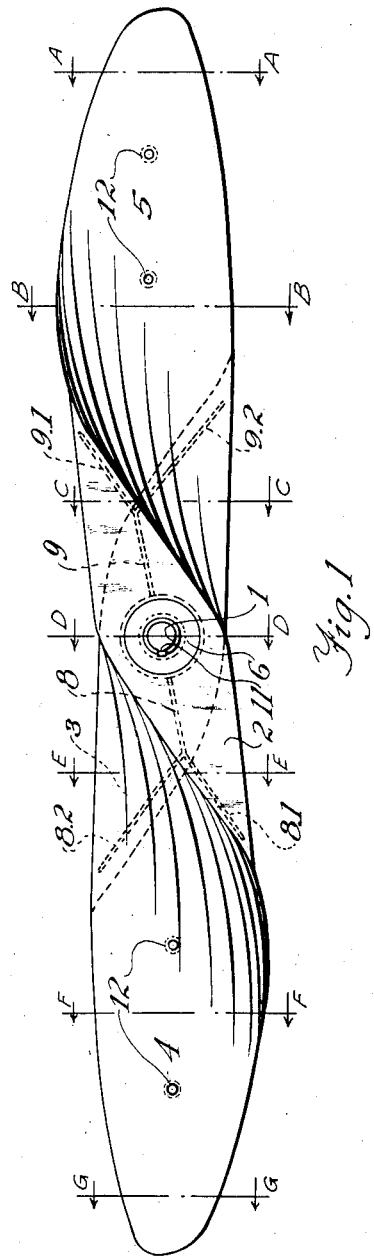
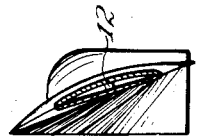
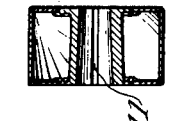
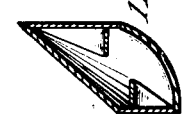
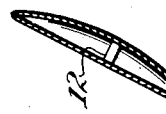
Witness
George C. Schultz
Inventor
Niels A. Christensen,
By Rummler & Rummler,
Attys.

N. A. CHRISTENSEN.
PROPELLER.
APPLICATION FILED OCT. 6, 1916.
1,369,399.
Patented Feb. 22, 1921.
2 SHEETS—SHEET 2.
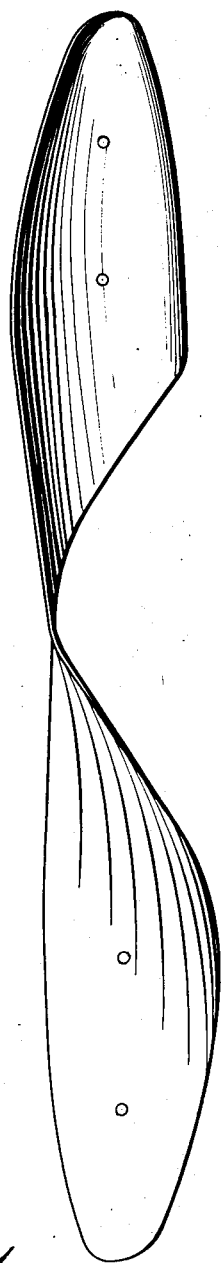
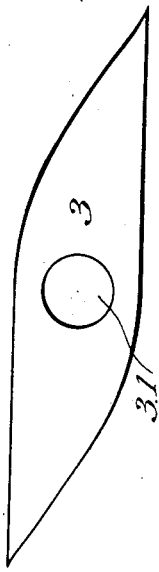
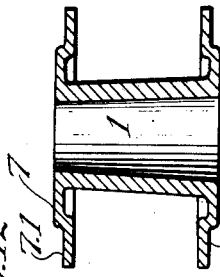
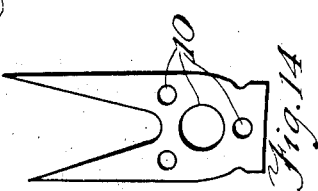

UNITED STATES PATENT OFFICE.

NIELS ANTON CHRISTENSEN, OF MILWAUKEE, WISCONSIN.

PROPELLER.

1,369,399.

Specification of Letters Patent.     Patented Feb. 22, 1921.

Application filed October 6, 1916. Serial No. 124,074.

*To all whom it may concern:*

Be it known that I, NIELS ANTON CHRISTENSEN, a citizen of the United States of America, and a resident of Milwaukee, county of Milwaukee, and State of Wisconsin, have invented certain new and useful Improvements in Propellers, of which the following is a specification.

The main objects of this invention are to provide an improved construction for propellers which will afford a form that is unusually light in weight but amply rigid and durable to sustain the most excessive strains; to provide an improved design and arrangement of parts whereby the same may be made mainly out of sheet material and be conveniently assembled with welded joints so as to provide a substantially integral structure of any desired shape; to provide an improved form of interior bracing for the hub portion of such propeller; and to provide improved means for readily balancing the propeller.

An illustrative embodiment of this invention as applied to an aerial propeller is shown in the accompanying drawings, in which:

Figure 1 is an end elevation.

Fig. 2 is a side elevation.

Figs. 3 to 9 are cross sectional details of the propeller taken on the lines A—A, B—B, C—C, D—D, E—E, F—F, and G—G, respectively, of Fig. 2.

Fig. 10 is a detail view of one of the plates which form the blades.

Fig. 11 is an enlarged detail view of the outer hub plate.

Fig. 12 is a similar view of the other or inner hub plate.

Figs. 13 and 14 are enlarged detail views of the gusset stays which brace the hub portion of the propeller.

Fig. 15 is an enlarged sectional detail of the hub.

In the construction shown in the drawings, the propeller comprises a hub 1, hub end plates 2 and 3, and blades 4 and 5 all of which are rigidly welded together, as will hereinafter appear.

The hub 1 is in the form of a spool having transversely disposed flanges 6 and 7 integrally formed at the ends to which the respective hub plates 2 and 3 are welded so as to virtually form continuations of said flanges. Recesses 6.1 and 7.1 are formed in the outer faces of the flanges 6 and 7, so as to provide seats for the hub plates 2 and 3 whereby a flush joint is formed between the flanges and the said hub plates.

The hub plates 2 and 3 are of flat sheet metal cut to substantially diamond shape, as shown in Figs. 11 and 12 of the drawings. These plates have circular openings 2.1 and 3.1 which fit the annular shoulders formed by the peripheral grooves 6.1 and 7.1 and allow said plates to seat into said grooves flush with the outer faces of said flanges. The plates are welded to the respective flanges 6 and 7 and stand at an angle to each other about the axis of the propeller. By making the hub plates 2 and 3 elongated as shown in the drawings, the driving strain between the hub and the propeller blades is well distributed.

Radially disposed braces or gusset stays 8 and 9 are interposed between the hub plates 2 and 3 extending from the hub outwardly to points near where the edges of the hub plates 2 and 3 cross, from which point said braces diverge in branches 8.1 and 8.2 and 9.1 and 9.2 respectively. These braces are welded to the hub 1, to the flanges 6 and 7 and to both of the end plates 2 and 3. These brace plates are shaped as shown in Figs. 13 and 14 and the branches 8.1 and 9.1 are welded to the hub plate 2 along the forward edges thereof, whereas the branches 8.2 and 9.2 are welded to the hub plate 3 along the following or tracking edges thereof.

The blades 4 and 5 are made out of two plates which are exactly alike in shape, (one of which is shown in Fig. 10), and helicoidically twisted so that one end of each becomes the front and the other end becomes the back of the respective plates when the two plates are turned end for end and secured together in superimposed relation. In the specific form illustrated the plates are cut out of sheet metal, each having two elliptically shaped ends connected by the contracted middle portion with the said two elliptical ends offset somewhat from a diametrically opposed relation. After being cut out, the plates are twisted at the contracted middle portions so that the ends face in substantially opposite directions. Before attaching the plates together the ends are properly shaped, one being left flat and the other being made concave to an extent equal to the depth between the two plates when assembled. The plates thus formed are superimposed one upon the other so that the flat end of one plate is joined with the concave end of the other plate. In securing the plates together the twisted portions are wrapped around opposite sides of the hub portion as will appear from a close examination of Fig. 2. The plates are welded together along their lateral edges and outer ends and to the hub plates 2 and 3 along their inner or intermediate portions. Thus, it will be seen that the upper or outermost plate, referring to the axial dimension, is joined to the advancing edges of the two hub plates on one side of the hub, and is joined to the following or tracking edges of said plates on the other side of the hub.

From the sectional view shown in Figs. 3 to 9 it will be observed that the pitch of the flat portion of the plate gradually increases from the tip ends, where the two plates are very close together, to the hub, where the two plates are spaced apart the maximum distance between the hub plates and hub flanges.

The gusset stays or braces 7 and 8 are preferably made of somewhat heavier material than that used in the other parts of the propeller but have portions cut out as indicated at 10, Figs. 2 and 14, in order to lighten the structure but without materially interfering with their strength.

The hub 1 is provided with a tapered socket in which the crank shaft of the engine is received and to which the propeller is secured by means of a drive key adapted to fit in the key way 11.

With regard to assembly, the arrangement of the parts of this propeller is decidedly advantageous in that all joints are readily accessible as the parts are put together, as will be obvious when it is understood that the hub plates 2 and 3 are first welded to the flanges 6 and 7 of the hub 1, after which the braces 8 and 9, together with their respective branches are welded to the hub 1 and to the hub plates 2 and 3 and then the blade plates are welded together and to the respective hub plates.

With regard to construction, this propeller is advantageous in that it will weigh eight or ten pounds less than the present form of wooden propeller with steel hub and yet it possesses far greater strength and can withstand the most excessive strains to which it is likely to be subjected in practice. The all metal construction completely avoids splintering, warping, damage by water, and other inherent faults of wooden propellers.

To provide for readily and accurately balancing the propeller, one or more tubes 12 are seated in holes bored through the blades, from front to back. These are welded at their ends to the respective plates of the blades and their ends are closed by welding after the propeller has been balanced by insertion into the tubes of an appropriate amount of ballast such as buck shot, metal slugs, etc. It will be noted that these tubes 12 also serve as stays for bracing the plates, and they may, of course, be placed where they will be most useful for this purpose.

Although but one specific embodiment of this invention is herein shown and described, it will be understood that numerous details of the construction shown may be altered or omitted without departing from the spirit of this invention as defined by the following claims.

I claim:—

1. A propeller formed of sheet material and comprising a pair of hub end plates and a pair of hub side plates secured together at their adjacent edges, one pair of said plates being extended to form the front and rear faces of a blade and being secured together along their marginal edges.

2. A propeller formed of sheet material and comprising a pair of hub end plates and a pair of hub side plates secured together at their adjacent edges, said hub side plates being extended to form the front and rear faces of a blade and being secured together along their marginal edges.

3. A propeller formed of sheet material and comprising a pair of hub end plates and a pair of hub side plates secured together at their adjacent edges, one pair of said plates being extended to form the front and rear faces of a blade and being secured together along and throughout their marginal edges.

4. A propeller, comprising a hub and blades, said blades comprising a pair of plates twisted at their middle portions around opposite sides of said hub and secured thereto and having their contiguous end portions superimposed and secured together along their marginal edges.

5. A propeller, comprising a hub having flanges on opposite ends thereof disposed transversely to the axis of said hub, and hollow blades formed of superimposed plates differently bent between their edges and secured together along their lateral edges and having their inner portions secured to said flanges.

6. A propeller comprising a hub having elongated plates secured to the opposite ends of said hub and disposed transversely to the axis thereof, and angularly arranged relative to each other, and hollow blades formed of superimposed plates differently bent between their edges and secured together along their lateral edges and having their inner portions secured to said flanges.

7. A propeller comprising a hub, spaced end plates secured to said hub, and hollow blades formed of differently bowed plates superimposed and secured together along their lateral edges and outer ends and having their inner portions spaced apart and secured to said end plates.

8. A propeller comprising a hub, transverse end plates spaced apart and secured thereto, and hollow blades secured edge to edge to said transverse plates and each comprising differently shaped front and rear plates secured together along their edges.

9. A propeller comprising a hub, elongated end plates secured to said hub, and blades comprising superimposed plates welded together along their lateral edges and bowed apart between said edges, one of said blade plates having its edges welded to both said end plates at one side of said hub, and the other of said blade plates having its edges welded to both of said end plates at the other side of said hub.

10. A propeller comprising a hub, diamond shaped end plates secured to said hub and disposed at an angle to each other about the axis of the propeller, and blades comprising superimposed plates welded together along their lateral edges and bowed apart between said edges, one of said blade plates having its edges welded to both said end plates at one side of said hub, and the other of said blade plates having its edges welded to both of said end plates at the other side of said hub.

11. A propeller comprising a hub provided with spaced annular flanges having peripheral grooves formed in the outer faces thereof, elongated end plates seated in the peripheral grooves of the respective said flanges and welded thereto, said end plates being disposed at an angle to each other about the axis of the propeller, and blades comprising superimposed plates welded together along their lateral edges and bowed apart between said edges, one of said blade plates having its edges welded to both of said end plates at one side of said hub, and the other of said blade plates having its edges welded to both of said end plates at the other side of said hub.

12. A propeller comprising a hub, elongated end plates secured to said hub, blades comprising superimposed plates welded together along their lateral edges and bowed apart between said edges, one of said blade plates having its edges welded to both of said end plates at one side of said hub, and the other of said blade plates having its edges welded to both of said end plates at the other side of said hub, and braces secured between said flanges and plates.

13. A propeller comprising a hub, elongated end plates secured to said hub, blades comprising superimposed plates welded together along their lateral edges and bowed apart between said edges, one of said blade plates having its edges welded to both of said end plates at one side of said hub, and the other of said blade plates having its edges welded to both of said end plates at the other side of said hub, and braces interposed between said flanges and plates and welded thereto.

14. A propeller comprising a hub, diamond shaped end plates secured to said hub and disposed at an angle to each other about the axis of the propeller, blades comprising superimposed plates welded together along their lateral edges and bowed apart between said edges, one of said blade plates having its edges welded to both of said end plates at one side of said hub, and the other of said blade plates having its edges welded to both of said end plates at the other side of said hub, and radial braces arranged perpendicularly between said hub plates and welded thereto, said braces having diverging branches at the ends thereof extending substantially parallel to the inner edges of said hub plates and welded respectively to the hub plates to which they are parallel.

15. In a propeller a hollow plate formed of superimposed plates secured together at their edges and spaced apart between their edges, and a tube extending between said plates and secured thereto so as to provide a ballast compartment for balancing the same.

16. A metallic propeller, comprising side plates concaved and axially twisted, the outer edge portions of the plates being secured together, the intermediate edge portions of the plates being divergently spaced toward the center of the body, and tapered end plates having their edges secured to the divergently spaced edge portions of the side plates.

Signed at Milwaukee this 30th day of September, 1916.

NIELS ANTON CHRISTENSEN.